(12) United States Patent
Leissner

(10) Patent No.: US 9,426,968 B2
(45) Date of Patent: Aug. 30, 2016

(54) METHOD AND APPARATUS FOR FEEDING WILDLIFE AND AQUATICS

(71) Applicant: Denton C. Leissner, Bay City, TX (US)

(72) Inventor: Denton C. Leissner, Bay City, TX (US)

(*) Notice: Subject to any disclaimer, the term of this patent is extended or adjusted under 35 U.S.C. 154(b) by 108 days.

(21) Appl. No.: 14/479,807

(22) Filed: Sep. 8, 2014

(65) Prior Publication Data

US 2016/0066538 A1 Mar. 10, 2016

(51) Int. Cl.
*A01K 5/02* (2006.01)

(52) U.S. Cl.
CPC ........... *A01K 5/0291* (2013.01); *A01K 5/0225* (2013.01)

(58) Field of Classification Search
CPC .... A01K 5/0291; A01K 5/02; A01K 5/0275; A01K 5/0225; A01K 61/025; A01K 61/02; B65G 53/42; B65G 53/66; B65G 53/40; B65G 53/58
USPC ............. 119/51.02, 51.04, 51.01, 56.1, 57.1, 119/57.91, 57.92, 51.11, 230; 222/394, 222/630, 491
See application file for complete search history.

(56) References Cited

U.S. PATENT DOCUMENTS

| | | | |
|---|---|---|---|
| 3,192,915 A | 7/1965 | Norris et al. | |
| 3,237,805 A * | 3/1966 | Stogner | G01F 13/001 222/1 |
| 3,523,520 A * | 8/1970 | Evans | A01K 61/02 119/230 |
| 3,528,588 A * | 9/1970 | Moore | A01K 61/02 119/51.04 |
| 4,381,898 A * | 5/1983 | Rotolico | B01J 8/001 406/118 |
| 4,967,697 A | 11/1990 | Lau | |
| 4,984,536 A * | 1/1991 | Powell | A01K 61/02 119/51.04 |
| 5,150,666 A * | 9/1992 | Momont | A01K 61/02 119/51.04 |
| 5,368,192 A * | 11/1994 | Ransom, II | A01K 5/0291 119/57.91 |
| 5,975,021 A | 11/1999 | Shingleton et al. | |
| 6,012,875 A * | 1/2000 | Goettelmann | B65G 53/14 406/144 |
| 6,571,736 B2 * | 6/2003 | Patterson | A01K 61/02 119/230 |
| 7,028,635 B1 | 4/2006 | Eastman, II | |
| 7,798,098 B1 * | 9/2010 | Patterson | A01K 5/0225 119/51.11 |
| 8,893,654 B2 * | 11/2014 | Wisecarver | A01K 5/0291 119/51.11 |
| 8,973,528 B2 * | 3/2015 | Weiguo | A01K 61/02 119/57.91 |
| 9,113,615 B1 * | 8/2015 | Scott | A01K 61/02 |
| 2005/0241588 A1 * | 11/2005 | Foster | A01K 5/0225 119/57.91 |
| 2007/0044724 A1 * | 3/2007 | Kvols | A01K 5/0291 119/56.1 |
| 2012/0085289 A1 * | 4/2012 | Quiring | A01K 5/0225 119/57.91 |
| 2015/0313189 A1 * | 11/2015 | Scott | A01K 5/0275 119/51.04 |

\* cited by examiner

*Primary Examiner* — Trinh Nguyen
(74) *Attorney, Agent, or Firm* — Gunn, Lee & Cave, P.C.

(57) ABSTRACT

A totally enclosed remote feeder for periodically dispensing feed is shown. A rechargeable battery powers a compressor which fills a pressure tank to a predetermined pressure. A timer operates a solenoid at predetermined intervals to cause a blast of air from the pressure tank to flow out through upwardly angled discharged pipe. Feed from an internal hopper flows downward in the discharge pipe in a predetermined amount prior to being discharged by the blast of air.

8 Claims, 10 Drawing Sheets

METHOD AND APPARATUS FOR FEEDING WILDLIFE AND AQUATICS

BACKGROUND OF THE INVENTION

1. Technical Field of the Invention

This invention relates to an apparatus and method for feeding wildlife and aquatics and, more particularly, to an enclosed feeder that can be filled while standing on the ground, yet projects a quantity of feed a distance away from the feeder with a sudden burst of pressurized air.

2. Description of the Prior Art

In many parts of the United States, hunting has become big business. On many ranches, more money is made off the hunting leases than is made off the raising of livestock. To attract hunters and to get a premium price for a lease, it is important that the hunters be able to kill the game they are hunting.

The most common method of hunting white-tailed deer is the use of a feeder that periodically feeds the deer. A blind for the hunter is located a short distance away, but within line of sight with the feeder. Leading up to the hunting season, feed such as corn is put in a feeder that will automatically dispense the feed at a predetermined time, normally shortly after daybreak. By the time hunting season arrives, the deer is used to going to the feeder after daybreak to eat some dispensed feed (typically corn).

When hunting season arrives, the hunter goes out to a deer blind that is within visible shooting distance of the deer feeder. The hunter will arrive before the scheduled dispensing of feed. If everything works according to plan, shortly after daybreak, the deer feeder will dispense feed, the deer will arrive and at daybreak, the hunter will have an opportunity to harvest the deer feeding next to the deer feeder.

Following the above scenario, whoever is managing the deer lease will periodically fill the deer feeders. Many different types of deer feeders have been designed, built and installed on leases. One type of deer feeder is located up high in a tree or on a stand. These types of deer feeders have to be lowered, or have some way provided, so that a person can fill the deer feeder. This is a very cumbersome task and sometimes requires two people.

Another problem that exists is that wild animals may get into or tip over the deer feeders. Wild or feral hogs are a problem in many parts of the country. The wild or feral hogs will root around and tip over the deer feeder, causing the feed to spill on the ground. Also, wild animals or rodents may get up inside of the deer feeder itself to eat the feed.

Another problem that exists with the current deer feeders is the deer feeders do not dispense an accurate measured quantity of feed. The feed that is dispensed has a tendency to fall right below the deer feeder and not be projected some distance away from the deer feeder.

BRIEF SUMMARY OF THE INVENTION

It is an object of the present invention to provide an improved method and apparatus for feeding wildlife and aquatics.

It is another object of the present invention to provide a feeder that can be filled by someone standing on the ground.

It is yet another object of the present invention to provide a feeder that cannot be tipped over, spilled, or destroyed by surrounding wildlife.

It is yet another object of the present invention to provide a feeder that will project feed a substantial distance away from the feeder.

It is still another object of the present invention to provide a feeder that can periodically be filled by one person and has a timer for dispensing measured amounts of feed at predetermined times.

The feeder is located relatively close to the ground with a top that can be removed and the feeder refilled by someone standing on the ground. A hopper inside of the feeder holds the feed until the feed is dispensed out of a discharge pipe upon receiving a blast of pressurized air. Upon receiving a blast of pressurized air, any feed contained in the discharge pipe is shot out of the end thereof. This causes the feed to be hurled a substantial distance away from the feeder. By angling the discharge pipe at an angle of between 30° and 45°, the maximum projection of the feed can be accomplished from a predetermined air blast.

To make the system self-sustaining, solar panels are used to recharge batteries, which batteries operate a compressor that will fill a tank with pressurized air. With the proper operation of solenoid valves, periodic blasts of air can be dispensed from a discharge pipe. Meanwhile, if the discharge pipe is filled with feed, the feed will be blown out of the discharge pipe with the pressurized air. By the proper use of the timer and the setting of the feeder, predetermined amounts of feed can be dispensed at predetermined intervals by the feeder. By having the entire feeder enclosed, animals or rodents cannot get into the feeder and eat the non-dispensed feed. Also, by having the feeder totally enclosed, the likelihood that a wild animal will damage the feeder is greatly reduced. By the top of the feeder being approximately shoulder height, a single individual can dump feed into the top of the feeder.

BRIEF DESCRIPTION OF THE DRAWINGS

FIG. 8A is a bottom view of FIG. 8 along lines 8a-8a.
FIG. 9C is an end view of FIG. 9a.

DESCRIPTION OF THE PREFERRED EMBODIMENT

Figure 1:
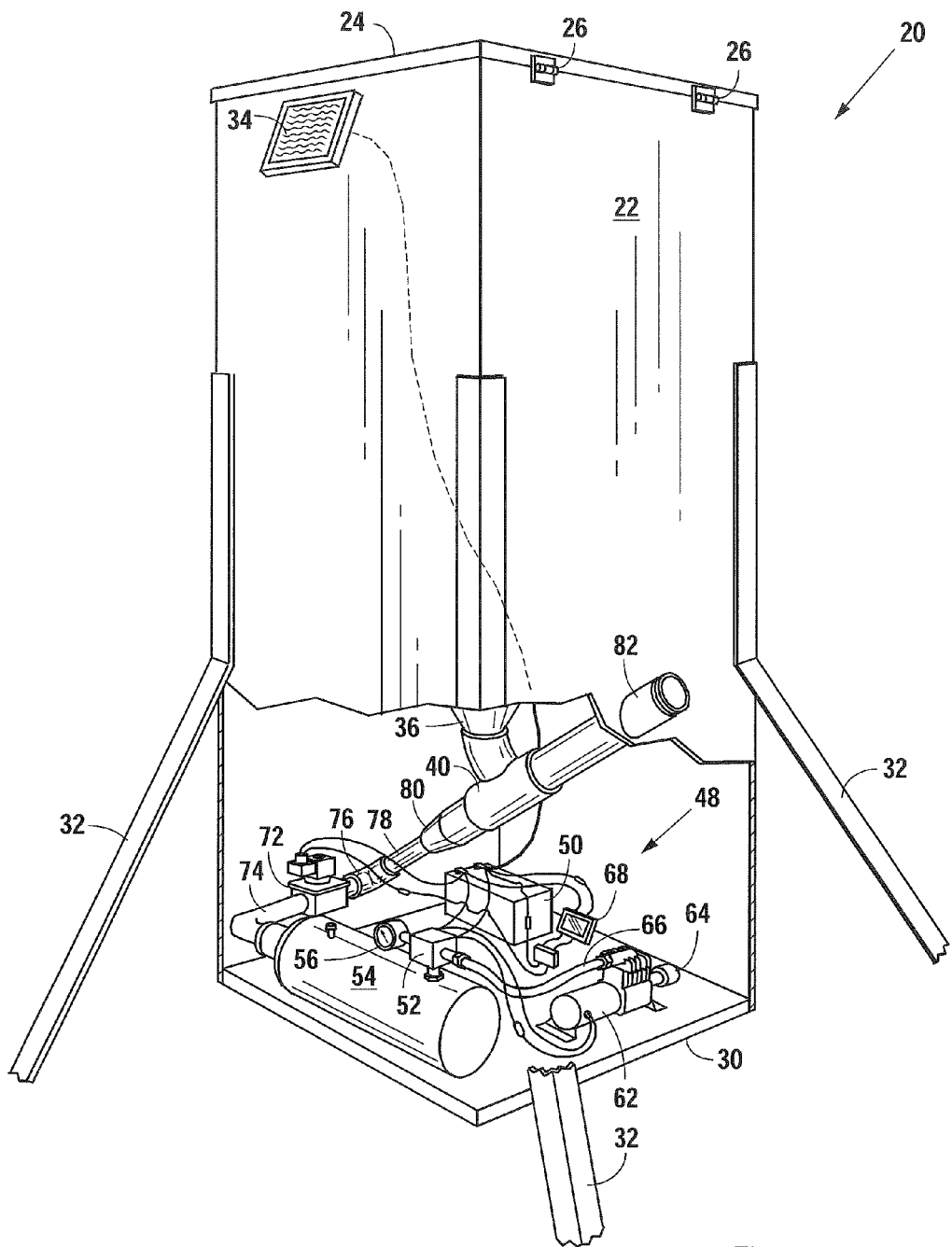
FIG. 1 is a cut-away perspective view of the feeder.
Figure 2:
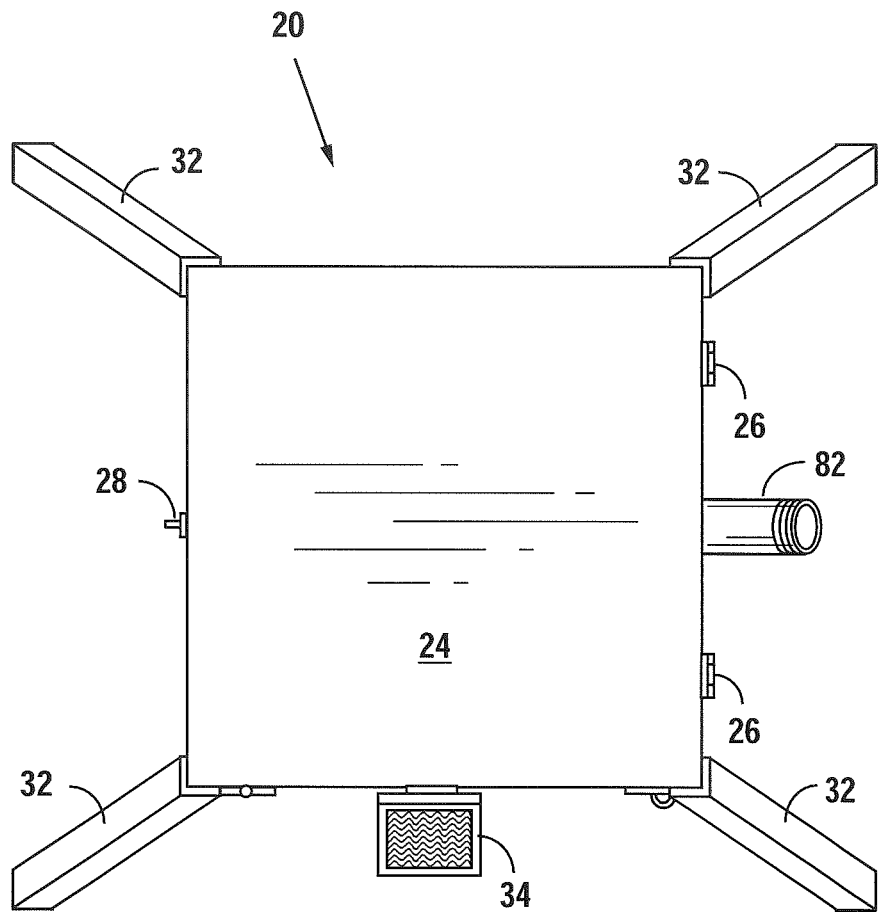
FIG. 2 is a top view of FIG. 1.
Figure 3:
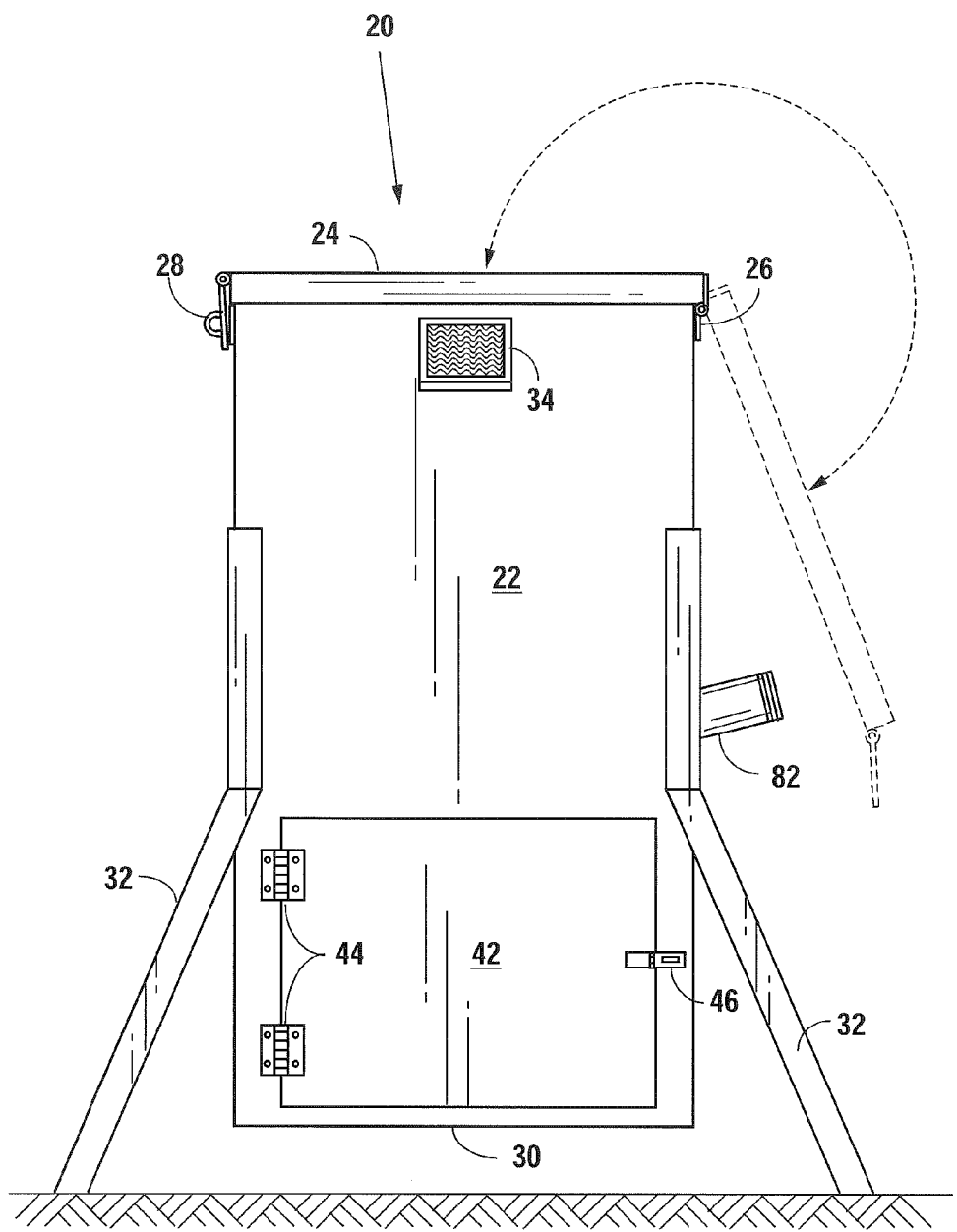
FIG. 3 is a side view of FIG. 1.

Referring to FIGS. 1, 2 and 3 in combination, the feeder represented generally by reference numeral 20 is shown. The feeder 20 is approximately shoulder height and has a rectangular box shape 22. The rectangular box shape 22 has a top 24 connected on one side by hinges 26. The top 24 may be secured in a closed position by safety hasp 28.

The rectangular box shape 22 has a bottom 30 that can sit directly on the ground, but in the preferred embodiment has corner braces 32 extending out from each of the corners. The corner braces 32 may be angled out and welded on the upper ends thereof to the corners of the rectangular box shape 22. Being angled out towards the bottom prevents the feeder 20 from being tipped over by animals.

On the upper outside of the rectangular box shape 22 is a solar panel 34 that connects to the internal controls as will be subsequently described.

Figure 4:
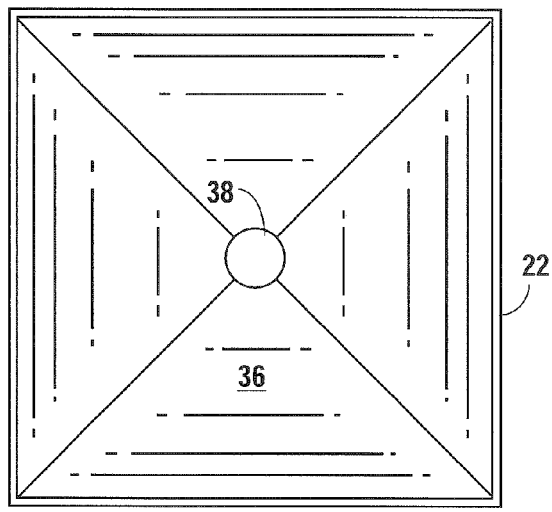
FIG. 4 is a top view of the inside of the feeder with the lid removed.

By opening the lid 24 on the feeder 20 as shown in FIG. 3, an individual can fill an internal hopper with feed such as corn. The internal hopper 36 is shown in FIG. 4. The internal hopper 36 has a discharge opening 38 through which feed contained in the internal hopper 36 may flow. The discharge opening 38 connects to a T-joint 40 (see FIG. 1).

Referring to FIG. 3, a door 42 is provided in the bottom of the rectangular box shape 22, which door 42 is mounted on hinges 44 and may be closed with a safety hasp 46. Inside of the door 42 is the firing mechanism 48 of the feeder 20 (see FIG. 1). The electrical schematic diagram of the firing mechanism 48 is shown in FIG. 6.

Figure 5:
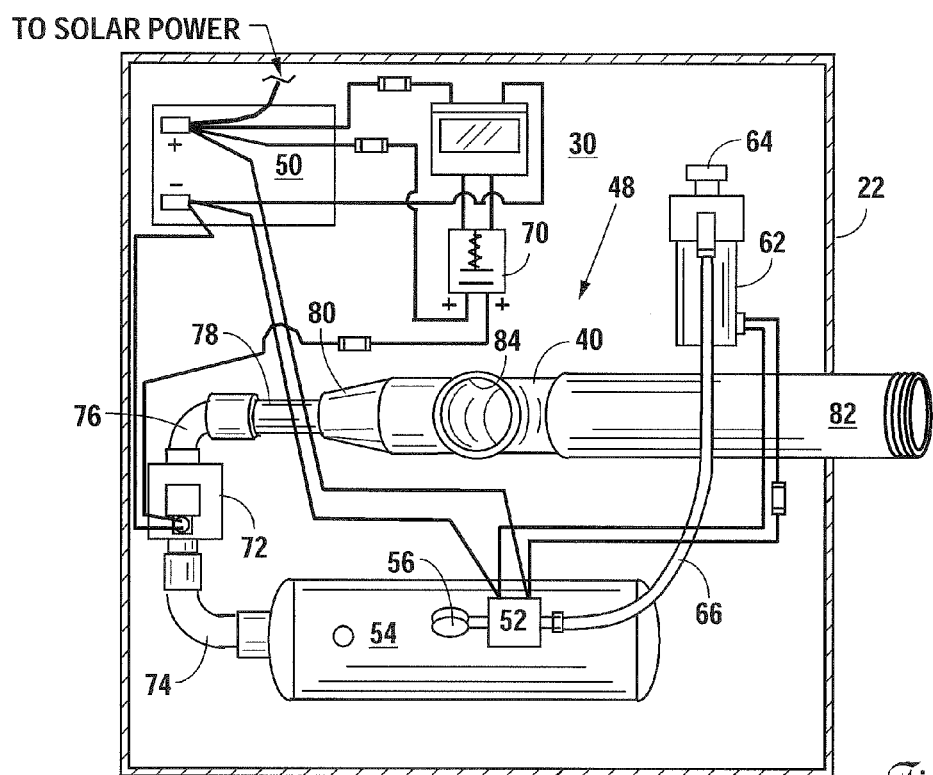
FIG. 5 is a top view of the control portion of the feeder.
Figure 6:
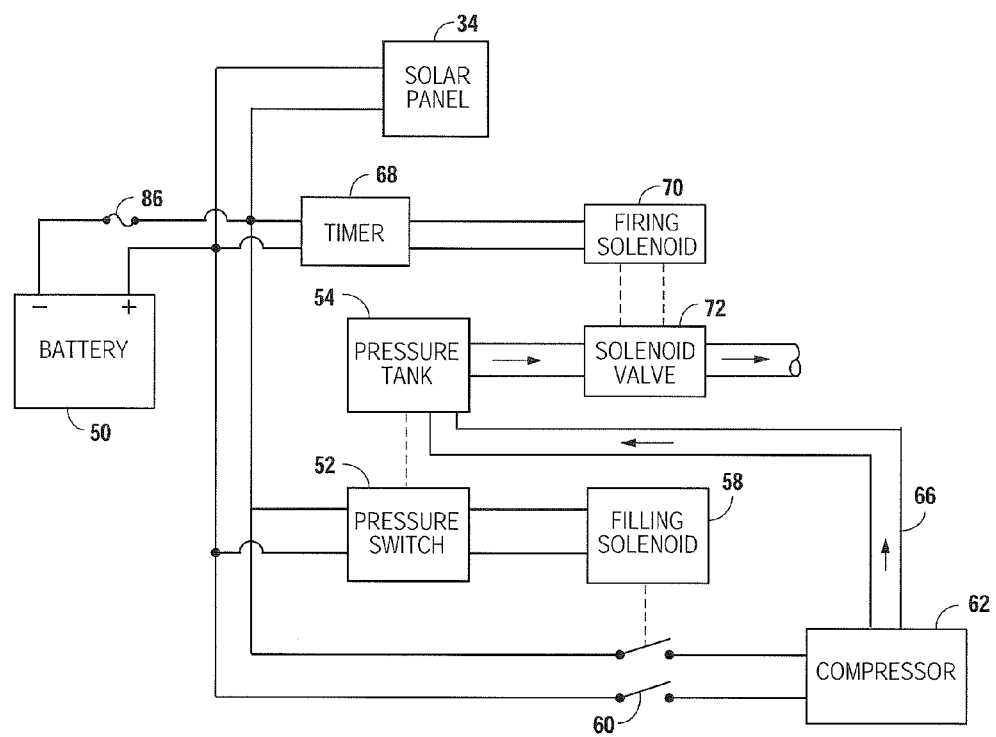
FIG. 6 is an illustrative electrical schematic of the feeder.

Referring to FIGS. 1, 5 and 6 in combination, a rechargeable battery 50 is mounted on the bottom 30 of the rectangular box shape 22. The rechargeable battery 50 connects to a pressure switch 52 that measures the pressure inside of pressure tank 54. Also, a pressure indicator 56 (see FIG. 1) gives a visual indication as to the pressure inside of pressure tank 54.

If the pressure measured by the pressure switch 52 drops below a predetermined pressure, switches are closed by the pressure switch 52 and filling solenoid 58 is activated closing normally open contacts 60, thereby connecting the compressor 62 to the battery 50. The compressor 62 will draw air in through the filter 64 and discharge compressed air through compressed air line 66 to the pressure tank 54. Once pressure inside a pressure tank 54 reaches the predetermined level, power to the filling solenoid 58 will be removed and normally open contacts 60 opened.

After the pressure tank 54 has been filled, timer 68, which connects to the rechargeable battery 50, is set so that at a designated time, contacts will close connecting firing solenoid 70 to the rechargeable battery 50. Upon connecting the firing solenoid 70 to the rechargeable battery 50, the firing solenoid 70 operates solenoid valve 72. Solenoid valve 72 is only activated for a fraction of a second before it closes again. During that fraction of a second, a blast of air leaves the pressure tank 54, moves through tank elbow 74, through solenoid valve 72 and discharge elbow 76. Then, the blast of pressurized air moves through connecting tube 78, flare 80 to T-joint 40. Anything located in T-joint 40, such as animal feed, is blasted out of discharge pipe 82 with the burst of pressurized air. The upper opening 84 in the T-joint 40 is connected to the discharge opening 38 of the internal hopper 36. See FIGS. 1, 4 and 5 in combination.

To keep the rechargeable battery 50 charged, the solar panel 34 is connected to the rechargeable battery 50 (see FIG. 6). The solar panel 34 includes the necessary components to generate electricity from sunlight to recharge rechargeable battery 50. In case something shorts out in the electrical circuit shown in FIG. 6, a fuse 86 is included in the circuit.

Figure 7:
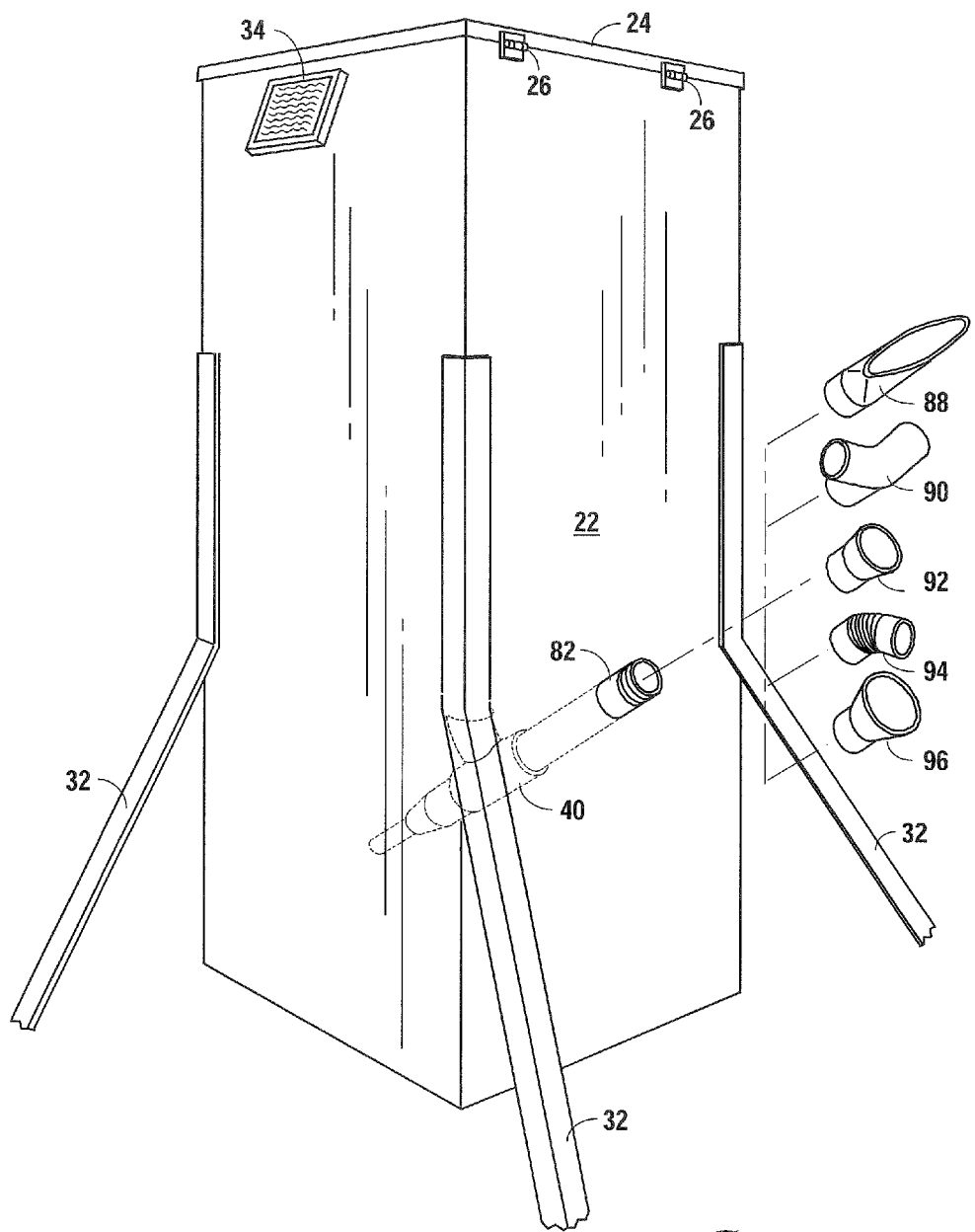
FIG. 7 is a perspective view of the feeder with various attachments being illustrated to disperse the feed.

To control the direction in which the feed will be projected out of discharge pipe 82, different attachments may be connected to the end of the discharge pipe 82. Some alternative connections that may be connected to the end of the discharge pipe 82 are shown in FIG. 7, such as the side flare 88, T-joint connection 90, slight flare 92, directional attachment 94 or large flair 96. Each of these attachments will project the animal feed in a different pattern.

Figure 8:
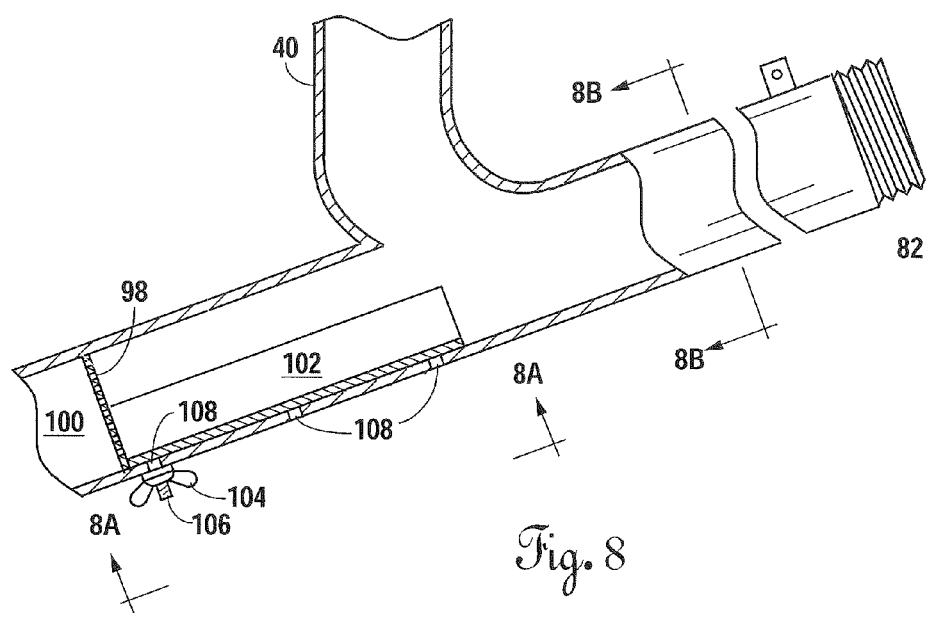
FIG. 8 is a partial sectional view of the discharge pipe of the feeder.
Figure 8A:
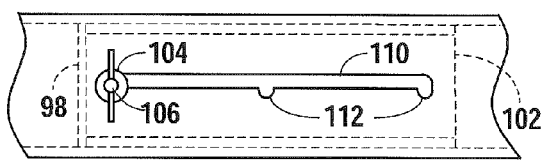
Figure 8B:
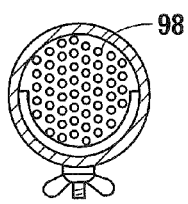
FIG. 8B is a cross-sectional view of FIG. 8 along section lines 8b-8b.

To adjust the amount of feed being projected out of the discharge pipe 82, the T-joint 40 may be modified as shown in FIGS. 8, 8a and 8b. A perforated plate 98 is located in the passage 100 of the T-joint 40. The perforated plate 98 is attached to one end of half-cylinder 102 by any convenient means, such as welding. The blast of air can move through the perforations in the perforated plate 98. The position of the perforated plate 98 and the half-cylinder 102 may be adjusted by removing the wing nut 104 and moving the screw 106, which attaches to the half cylinder 102, to one of the other holes 108 of the T-joint 40. As shown in FIG. 8a, the screw 106 can move along the slot 110 until it would reach a new notch 112.

By moving the perforated plate 98 to the left as shown in FIG. 8, more feed will accumulate inside of the T-joint 40. By moving the perforated plate 98 to the right, less feed will accumulate in the T-joint 40. In this manner, the amount of feed being delivered can be regulated.

Figure 10B:
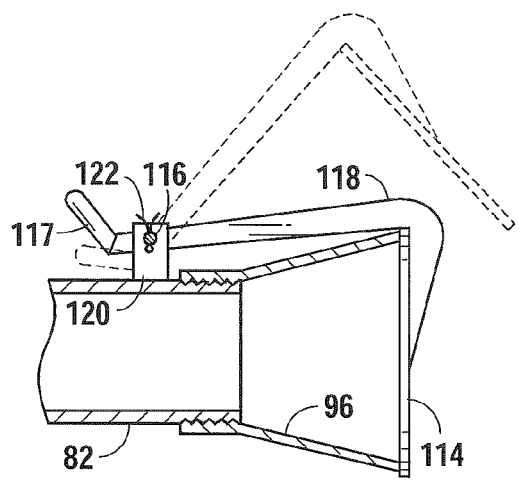
FIG. 10B is a cross-sectional view of FIG. 10A along section lines 10B-10B.
Figure 10C:
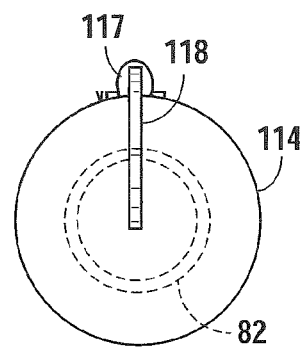
FIG. 10C is an end view of FIG. 10A.
Figure 10A:
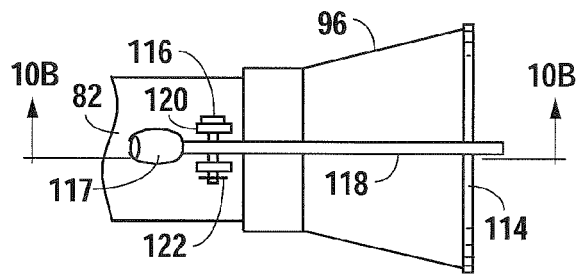
FIG. 10A is a top view the end of the discharge pipe of the feeder with an attachment thereon.

One of the problems that has existed in the past is that animals and varmints would go inside of any opening to get to the feed contained inside of a deer feeder. To prevent that from occurring with the present invention, a hinge cover 114 is threadably connected to the end of discharge pipe 82 as shown in FIGS. 10A, 10B, and 10C. As seen in the top view of FIG. 10A, the hinge cover 114 is connected to a hinge pin 116 via a cover retainer 118. On the opposite end of the cover retainer 118 is a counterweight 117 that is just enough weight to retain hinge cover 114 to the closed position, but requiring very little internal pressure to open hinge cover 114, similar to what may be on an exhaust pipe. The cover retainer 118 is connected to the hinged cover 114 by any convenient means such as welding. In the middle between the hinge cover 114 and the counterweight 117, the cover retainer 118 is pivotally connected through hinge pin 116 to hinge bracket 120 on discharge pipe 82. The hinge pin 116 is held in position by carter key 122.

By use of the hinge cover 114 with counterweight 117 as described in FIGS. 10A through 10C, once the blast of air comes through the discharge pipe 82, the hinge cover 114 will swing back out of the way for the blast of air and feed exiting the discharge pie 82. Once the blast of air has passed, the counterweight 117 is just enough to cause hinge cover 114 to swing back into place to cover up the large flare 96 shown in FIGS. 10A and 10B.

Figure 11:
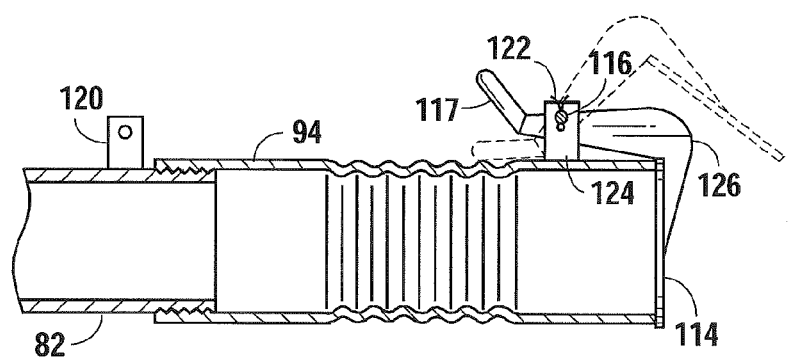
FIG. 11 is an end view of the discharge pipe of the feeder with a different attachment thereon.

If the discharge pipe has a directional attachment 94 attached thereto as shown in FIG. 11, the hinge cover 114 will have to connect to a hinge bracket 124 that is mounted on the end of directional attachment 94. The hinged cover 114 will connect to the hinge bracket 124 via cover retainer 126, which has a counterweight 117 on the opposite end thereof.

Figure 9A:
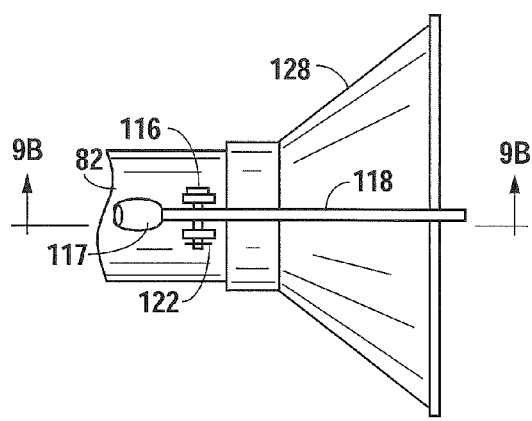
FIG. 9A is a top view the end of the discharge pipe of the feeder with an attachment thereon.
Figure 9B:
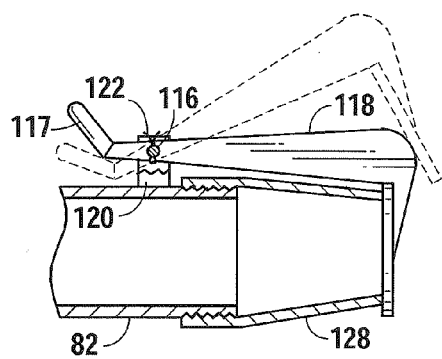
FIG. 9B is a cross-sectional view of FIG. 9a along section lines 9b-9b.
Figure 9C:
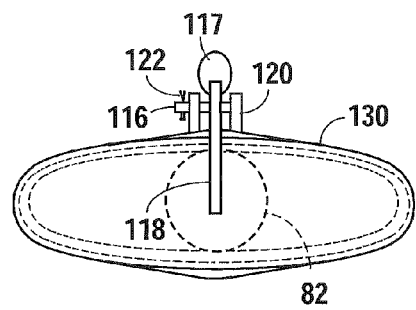

FIGS. 9A through 9C illustrate the use of an elliptical flare 128 connected to the end of the discharge pipe 82. The elliptical cover 130 connects to the previously described hinge pin 116 via cover retainer 118. Again, the hinge pin, which extends through cover retainer 118 and hinge bracket 120 is held into position by carter key 122. By use of the elliptical flare 128 as shown in FIGS. 9a through 9c, the feed will be dispensed over a wider area. The counterweight 117 insures a minimum force is used to return elliptical cover 130 to the closed position after the blast of air and feed passes there through.

Figure 12:
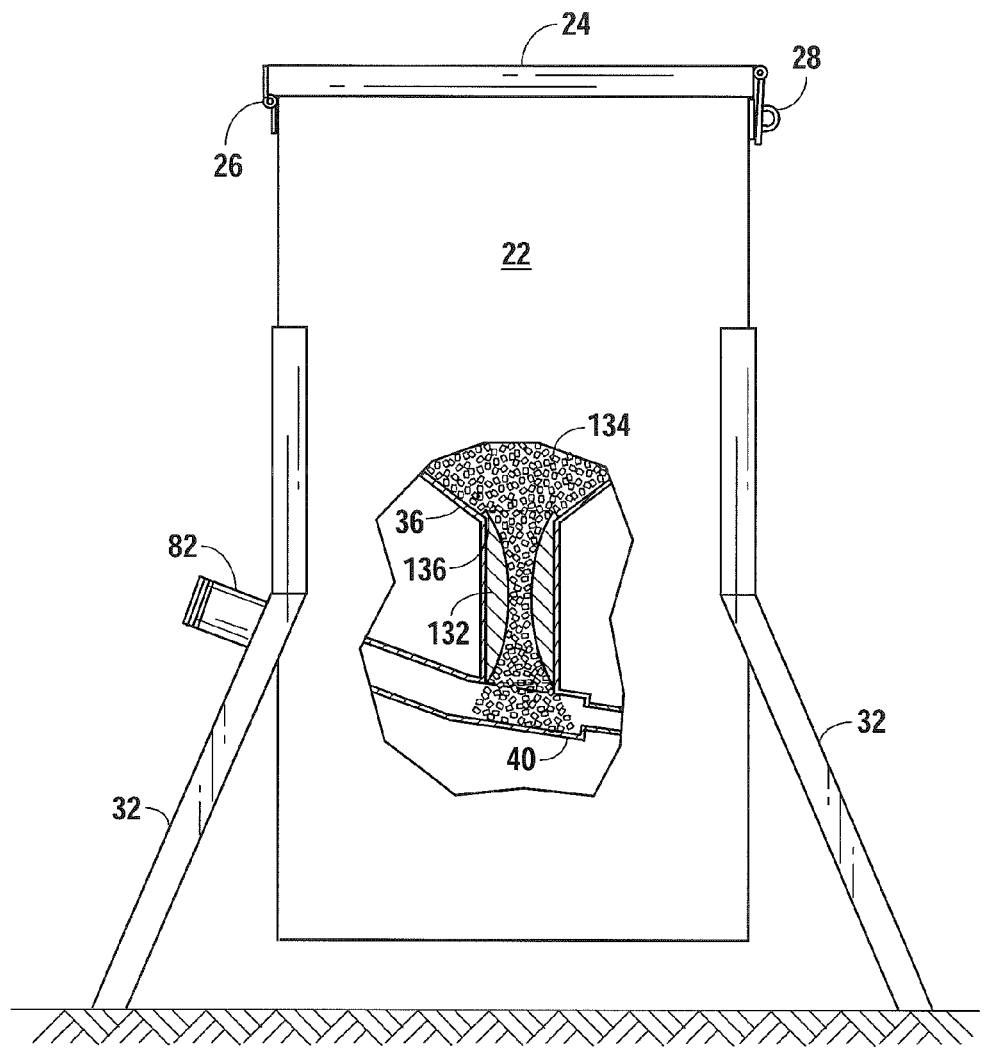
FIG. 12 is a partial sectional view of the feeder illustrating an alternative way of filling the discharge pipe.

Referring now to FIG. 12, an alternative way of controlling the amount of feed being projected out the discharge pipe 82 is shown. By having a removable restriction 132 between the internal hopper 136 and the T-joint 40, the amount of feed 134 flowing into the T-joint 40 is controlled. Therefore, when a blast of air comes through the T-joint 40, only the amount of feed 134 that is fed down into T-joint 40 will be propelled out of the end of the discharge pipe 82. Proper sizing of the restriction 132, will control how much feed 134 will be propelled out of discharge pipe 82 during each cycle.

The restriction 132 may be dropped into the discharge opening 38 (see FIG. 4) and held in position by the upper flange 136. Once feed 134 is placed in the internal hopper 36, the amount of feed 134 that will flow through the restriction 132 into T-joint 40 is controlled by the angle of repose of the feed 134. The restriction 132 can be changed, which will change the amount of feed 134 flowing into the T-joint 40, and being discharged during each blast of air.

What I claim is:

1. A totally enclosed remote animal feeder for periodically dispensing feed to wild animals comprising:
    a box standing about shoulder height;
    a hopper inside said box with a lower discharge opening, said hopper have said feed therein;
    a top on said box, said top being removable to allow feed to be poured into said hopper;
    a lower door in said box to allow access to a firing mechanism located in said box;
    a battery to provide power to said firing mechanism;
    a compressor for filling a pressure tank when pressure therein drops below a predetermined level as measured by a pressure switch, said pressure switch and said compressor being connected to said battery;
    filling solenoid operated by said pressure switch to apply power from said battery to said compressor when said pressure drops below said predetermined level;
    timer connected to said battery, said timer periodically applying power to a firing solenoid to operate a solenoid valve controlling an outlet from said pressure tank, said firing solenoid causing a short burst of pressurized air through said outlet; and
    a tube for directing said burst of pressurized air through a junction and out a discharge pipe, said junction containing said feed from said hopper, which feed is projected a distance away from said feeder with said burst of pressurized air.

2. The totally enclosed remote animal feeder for periodically dispensing feed to wild animals as recited in claim 1 which includes solar panels connected to said battery to keep said battery charged.

3. The totally enclosed remote animal feeder for periodically dispensing feed to wild animals as recited in claim 2 wherein said discharge pipe is raised at an angle to project said feed a further distance from said feeder.

4. The totally enclosed remote animal feeder for periodically dispensing feed to wild animals as recited in claim 3 wherein said discharge pipe has a hinged cover that covers an end of said discharge pipe, said hinged cover opening when said burst of pressurized air and said feed pass there through, otherwise said hinged cover covering said end of said discharge pipe.

5. The totally enclosed remote animal feeder for periodically dispensing feed to wild animals as recited in claim 4 wherein said junction has a restriction leading to said feed in said hopper, said restriction limiting the amount of said feed that can flow by gravity into said junction, and hence limiting said amount of said feed that can be projected.

6. The totally enclosed remote animal feeder for periodically dispensing feed to wild animals as recited in claim 5 wherein said discharge pipe has a connection on the end thereof to help disperse said feed.

7. The totally enclosed remote animal feeder for periodically dispensing feed to wild animals as recited in claim 6 wherein said box has corner braces to keep said box upright.

8. The totally enclosed remote animal feeder for periodically dispensing feed to wild animals as recited in claim 7 wherein said top and said door are lockable.

* * * * *